April 24, 1956   W. ZAHN   2,743,132
FASTENER FOR VEHICLE COVERINGS
Filed Jan. 8, 1952
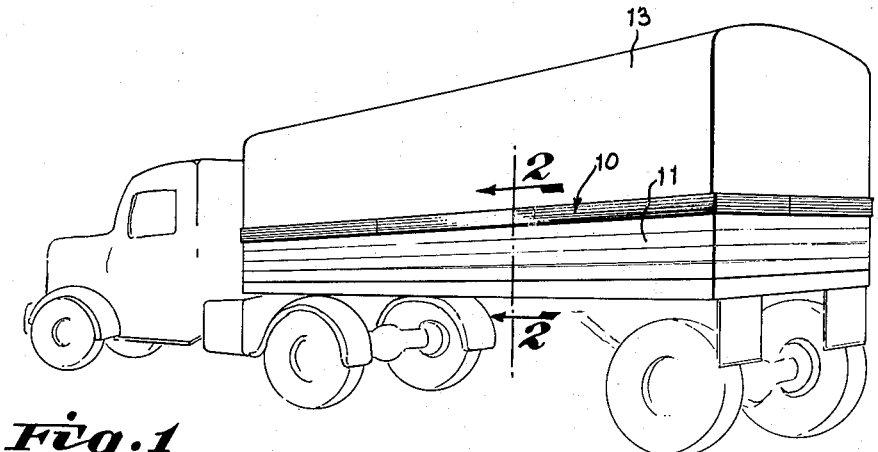
Fig. 1
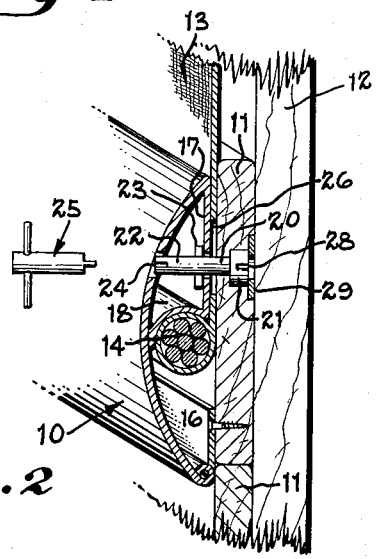
Fig. 2
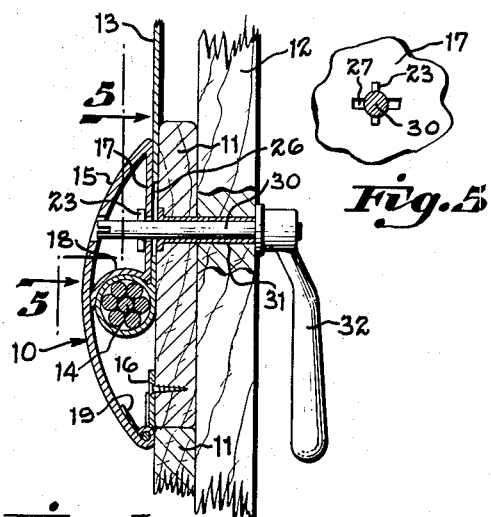
Fig. 3
Fig. 5
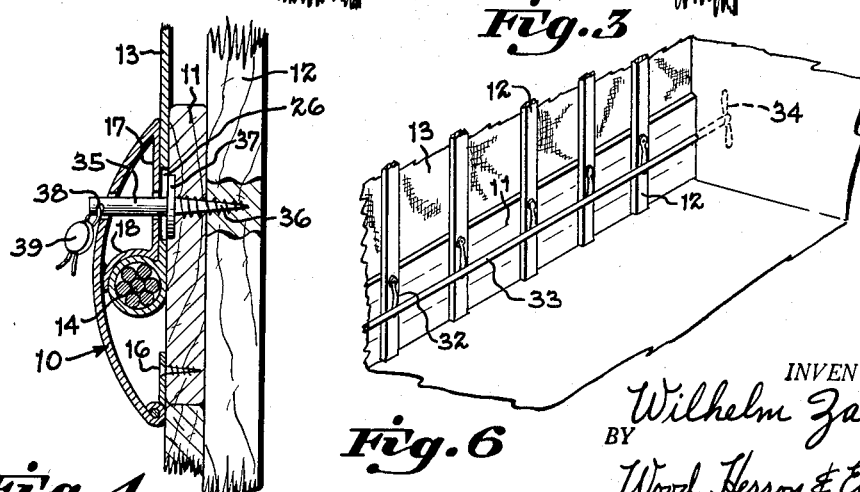
Fig. 4
Fig. 6
INVENTOR.
BY Wilhelm Zahn.
Wood, Herron & Evans.
ATTORNEYS.

United States Patent Office 2,743,132
Patented Apr. 24, 1956

2,743,132

FASTENER FOR VEHICLE COVERINGS

Wilhelm Zahn, Bayreuth, Germany

Application January 8, 1952, Serial No. 265,427

6 Claims. (Cl. 296—100)

This invention generally concerns the fastening of the coverings or tarpaulins which are used on trucks, trailers and similar vehicles. More specifically, the invention is directed to a clamping strip or panel, in the nature of a cover plate, which is hinged to the outside of the body of the vehicle and adapted to embrace a beading provided along the lower edge of the covering and thereby secure it to the truck body.

In the past it has been conventional to fasten canvas coverings of vehicles by means of ropes which were looped through metal eyelets in the lower margin of the covering, the ropes being anchored to cleats disposed about the lower portion of the truck body. The rope fastenings were of course spaced apart and had to be individually tied in place.

Such fastening means were comparatively inexpensive but less than satisfactory for a number of reasons. For one thing the spacing of the individual ropes permitted the canvas coverings to flap, and also permitted the entry of dust, rain, and mud spattered by traffic. It was also difficult to draw up all of the ropes evenly so that the canvas covering was not wrinkled. Also in cold, icy weather it was impossible to manipulate the ropes without a great deal of difficulty.

One of the objects of the present invention is to provide a vehicle cover fastening which obviates most of the above noted difficulties in that it provides a continuous seal for the lower edge of the covering.

It is a further object of the invention to provide fastening means for the covering of a vehicle which are adapted to be quickly and easily manipulated, and less apt to be affected by cold weather and ice than the ropes used in the past.

It is another object of the invention to provide fastening means of the type referred to which may be locked to seal the interior of the truck and thus protect the cargo from petty thievery. In addition the lock provides is such that it may be sealed by customs or other government officials.

Another object is to provide fastening means which embrace the lower end of a truck covering or the like around its entire girth instead of at spaced points as has been done in the past.

Another object has been to provide a fastening of the type referred to which is adapted to be latched and unlatched from the inside of the truck as well as from the outside. This expedient adapts the covering to troop transport trucks where it may be necessary in the case of an emergency for the troops to leave the truck hurriedly. In addition, it is possible with the latch provided, to arrange for freeing an entire side of the truck covering from the cab of the truck in the event of an emergency.

Other objects and advantages of the invention will be readily apparent to those skilled in the art from the following description of the drawings in which:

Figure 1 is a perspective view showing the cover fastening of the present invention installed on a semi-trailer.

Figure 2 is a fragmentary cross sectional view, in perspective, taken on the line 2—2 in Figure 1 illustrating a preferred embodiment of the invention.

Figure 3 is a cross sectional view showing a modified form of the latch used for the clamping strip or panel, the latch being arranged so that it may be opened from the inside of the truck.

Figure 4 is a cross sectional view similar to Figure 3 illustrating another form of the latch which may be used where it is desired to seal the truck cargo, as for example, for customs or other governmental agencies.

Figure 5 is a fragmentary cross sectional view taken on the line 5—5 in Figure 3.

Figure 6 is a diagrammatic view of the inside of a truck showing a means for unlatching all fasteners along one side of a vehicle simultaneously.

The clamping strips or panels of this invention are indicated at 10 in Figure 1. Preferably these strips or panels are disposed end to end and extend completely around the body of the vehicle. The semi-trailer shown in Figure 1 is intended to be representative only of a number of vehicles to which the invention is applicable. It is believed with this example that it will be readily apparent to those skilled in the art how the invention can be adapted to any vehicle utilizing a canvas or similar covering. The semi-trailer shown includes side boards indicated at 11 which are secured to a plurality of conventional top bows 12. These bows are shown fragmentarily only in Figures 2–4. The bows support covering material 13 which encloses the upper portion of the truck. In order to adapt conventional coverings to use with the present invention, the lower edges of the coverings are beaded as shown at 14. The beading may be fabricated by enclosing a length of manila rope in the lower edge of the covering or it may be formed by folding or rolling up the lower edge. The formation itself of the beading is not particularly important and its shape may vary within considerable limits, however, the rounded beading shown at 14 is preferred.

The clamping strips or panels 10 may be formed from aluminum or other light metal sheeting however, it will be obvious that other materials may be used. In the preferred embodiment, the panel is rounded as at 15, displaying a convex surface outwardly. At the lower edge of the panel 10, a hinge leaf 16 is journalled. This leaf may be continuous or broken into sections. Preferably the hinge leaf is turned up as shown in Figures 2–4 and fastened to side boards 11 by wood screws or similar fastening means so that it is enclosed within the panel or strip. At the upper edge, the strip 10 is turned down to provide a face plate portion 17. At approximately the mid-line at the inner face of the strip a pocket or groove 18 is provided by turning the lower edge of face plate 17 outwardly and shaping it into the configuration of an inverted channel. At the outer margin, the inverted channel may be secured to the inner face of the locking panel by welding or other means.

It will be obvious that the panel configuration described may be formed of wood or that a combination of metal and wood or other materials may be used. The important consideration is to provide a pocket 18 which is of such a shape that it embraces the beaded edge 14 of the canvas cover when the panel is in the position shown in Figures 2-4. In this position, it will be seen that it is impossible for the canvas to be withdrawn. Preferably pocket 18 is spaced above the lower edge of the locking panel to afford a certain freedom of movement for the beading 14 to accommodate the stretching and shrinkage of canvas and similar materials incident to humidity changes. In the instance shown, the canvas covering is stretched tightly and beading 14 is fitted securely in pocket 18. It will be obvious that if the canvas were completely dry that the beading might be below the pocket. But in any event, it is locked against withdrawal past the point shown in Figures 2-4.

Although shown only diagrammatically in the drawings, it will be obvious that a spring 19 may be utilized between the lower end of locking panel 10 and the hinge leaf 16, the spring being arranged to either force the panel to the closed position or to the open position. If the former type spring is utilized, certain installations may require nothing more to hold the beading within the locking panel, however, it is preferred that positive locking means be utilized.

One type lock is shown in Figure 2. In this instance a stud 20 is employed. Where long panels are utilized, two or more of these locks may be required for each panel, the locks being disposed toward the ends of the panel. In shorter panels only one lock may be required, the number, of course, depending upon the particular installation. The stud 20 has a head 21 which is countersunk within an appropriate bore in the inner face of one of the side boards 11. The shank portion 22 of the stud extends outwardly therefrom beyond the outer face of the side board. A cross-pin 23 is carried by the shank 22, and the outer end of the shank is slotted as at 24 to accommodate a simple key-like tool indicated generally at 25 which is used to rotate the stud. The shank of the stud passes through a vertical slit 26 near the lower end of the canvas but above the beaded edge 14. Preferably the slit is sufficiently long to accommodate stretching or shrinking of the covering without binding upon the stud. The face plate portion 17 of the locking panel and the outer face thereof are bored to accommodate the stud. In addition, as shown in Figure 5 cross-slots 27 are provided at the respective sides of the hole through face plate 17 to accommodate cross-pin 23. Preferably the cross-slots are generally horizontally disposed so that the stud must be turned 90 degrees from the position shown in Figure 2 in order to permit cross-pin 23 to pass through the cross-slots 27. Once through, the studs may be turned by key 25 to place cross-pin 23 at right angles to the horizontal slot. Appropriate detents, not shown, may be provided to hold the studs in the two positions of rotation. Preferably another key slot 28 similar to the one 24 is provided in the inner end of the stud 20 so that key 25 may be used to latch or unlach the stud from the inside of the truck if necessary. A key plate 29 may be imbedded in the wood around the head 21 of the stud to prevent its withdrawal, the key plate having a central opening to accommodate key 25.

In Figure 3 a slightly modified form of latch is provided. In this instance, in place of stud 22, a rod or shaft 30 is utilized, this rod or shaft being journalled in a bushing 31 which extends through an appropriate bore through the side panelling of the truck and one of the top bows. At the inner end of shaft 30, a handle 32 is keyed. This form of latch is preferred where the fastening means are to be utilized for troop transport. If desired all of the handles 32 along one side or both sides at the inside of the truck may be joined by tie rod 33 so that all may be operated simultaneously. The rod may be extended through the front of the truck or trailer into the cab as shown by dotted lines in Figure 6, and an operating lever 34 utilized for turning the handles in unison. This arrangement is desirable where, under emergency conditions, troops must leave the truck hurriedly.

In addition to the two latches discussed above, a seal-type lock may be provided for holding the panels in closed position. This modification is shown in Figure 4 and comprises a stud 35 having a screw threaded portion 36 at its inner end. The stud is screwed into the side panelling of the truck to a point where a collar 37 is impressed into the wood. The stud extends completely through the panel 10 and outside of the curved face thereof. Outside of the panel, a hole 38 extends through the stud to accommodate the wire of a conventional lead seal 39. This seal-type latch may be used in place of the locking types shown in Figures 2 and 3 or may be used in addition to them, one of the seal type studs being provided in each panel along with the one or more of the locking types described above, and used only when it is necessary or desirable to seal the cargo.

In order to enclose a truck or other vehicle the canvas covering is placed over top of the bows with the lower beaded edges placed just above the hinge leaves 16 and the slits 26 in the canvas engaged over the studs. The hinged locking panels may then be swung up against the side of the truck body and the studs turned to lock them securely in place. It will be apparent that this operation is less time consuming then the rope type fasteners utilized in the past. In addition, there are no isolated stresses placed upon the canvas covering, nor is there any opening left in the covering to permit the entry of dust or rain. The slits 26 serve as guides in positioning the canvas correctly when it is being placed upon the vehicle initially, and thus a smooth and wrinkle free job results. As seen in Figure 1, the continuous band of panels extending around the truck or vehicle is rather attractive and gives a rather ship-shape appearance to the vehicle.

Having described my invention I claim:

1. Means for fastening the lower edgewise portion of a covering for a vehicle to a side wall of said vehicle, said means comprising a beading formed along the lower edge of said covering, a panel hinged to the side wall of said vehicle below said beading and adapted to swing up and embrace the lower edgewise portion of the covering, a pocket formed in the inner face of said panel, said pocket adapted to receive said beading, a panel latch member projecting outwardly from the side of said vehicle, a latch member receiving aperture in said panel, and said latch member engageable in said aperture in locking relationship with the panel when said panel is swung up to embrace said lower edgewise portion of the covering.

2. Means for fastening the lower edgewise portion of a covering for a vehicle to a side wall of said vehicle comprising a beaded edge formed on the lower edge of said covering, a hinged panel secured to the side wall of said vehicle at a point below but adjacent to the lower edge of said covering, said panel adapted to swing up into a position in which it embraces the beaded edge of said covering, an inverted pocket formed in the inner face of said panel, said pocket adapted to receive said beaded edge and thereby prevent the upward withdrawal of said covering, a latch member projecting outwardly from the side of said vehicle, an aperture in said panel, and said latch member engageable in said aperture in locking relationship with said panel when said panel is swung up into said beaded edge engaging portion.

3. Means for securing a canvas covering to the side of a vehicle comprising a beading formed along the lower edgewise portion of said covering, a panel hinged to the side of the vehicle and adapted to swing up and against the side of the vehicle into a position overlying said beaded edge, a pocket formed in the inner face of said panel, said pocket adapted to embrace said beading, a latch member projecting outwardly from the side of said vehicle, a latch member receiving aperture in said panel, said latch member engageable in said aperture in locking relationship with said panel when said panel is swung up to embrace said beading.

4. Means for securing the lower edgewise portion of a canvas covering or the like to the side of a vehicle, said means comprising a panel hinged to the side of said vehicle and adapted to swing up against said side and overlie the lower edgewise portion of said covering, a beading formed along said lower edgewise portion, a pocket in the inner face of said panel, said pocket adapted to receive said beading, means for locking said panel in said position, said means including a rotatable stud extending outwardly from the side of said vehicle and traversing a vertical slit in said covering above said beaded edge and extending through an aperture in said panel, and means effective upon rotation of said stud for preventing outward movement of said panel relative to said stud.

5. Means for securing the lower edgewise portion of a canvas covering or the like to the side of a vehicle, said means comprising a panel hinged to the side of said vehicle and adapted to swing up against said side and overlie the lower edgewise portion of said covering, a beading formed along said lower edgewise portion, a pocket in the inner face of said panel, said pocket adapted to receive said beading, means for locking said panel in said position, said locking means including a stud rotatable between a locking and a non-locking position relative to said panel, a handle in the inside of said vehicle adapted to rotate said stud between said positions, and a tie rod extending from said handle forwardly in said vehicle whereby said handle may be remotely operated.

6. Means for securing the covering of a vehicle comprising a beading formed along the lower edge of said covering, a panel hinged to the body of the vehicle adjacent said beaded edge and adapted to swing into a position in which it overlies said beaded edge, a pocket formed in the inner face of said panel, said pocket adapted to receive said beaded edge, a latch member projecting outwardly from the side of said vehicle, an aperture in said panel, said latch member engageable in said aperture when said panel overlies said beaded edge, and said latch member including means effective upon the rotation of the member to prevent movement of the panel from said position in which it overlies said beaded edge.

References Cited in the file of this patent

UNITED STATES PATENTS

| | | |
|---|---|---|
| 894,759 | Stevens | July 28, 1908 |
| 1,333,906 | De Villers | Mar. 16, 1920 |
| 1,729,555 | Sparshatt | Sept. 24, 1929 |
| 1,867,272 | Larsen | July 12, 1932 |
| 2,510,307 | Daniels | June 6, 1950 |